United States Patent
Matsumoto (10) Patent No.: US 7,012,235 B2
(45) Date of Patent: Mar. 14, 2006

(54) IMAGE SENSOR

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/874,203

(22) Filed: Jun. 24, 2004

(65) Prior Publication Data

US 2005/0161583 A1    Jul. 28, 2005

(30) Foreign Application Priority Data

Jan. 28, 2004    (JP) .............................. 2004-020043

(51) Int. Cl.
   *G02B 27/10*    (2006.01)
(52) U.S. Cl. .................... 250/208.1; 250/216; 359/619
(58) Field of Classification Search ............ 250/208.1; 359/619–621, 623, 652, 653, 654, 664, 708–710; 65/37–39, 406, 408, 409; 358/471
See application file for complete search history.

(56) References Cited

U.S. PATENT DOCUMENTS 5,450,157 A  *  9/1995  Rees .............................. 355/1
6,147,697 A  *  11/2000  Deguchi et al. ............. 347/238
6,449,414 B1 *  9/2002  Tahara et al. ................ 385/120
6,724,537 B1 *  4/2004  Ogi ............................. 359/619

FOREIGN PATENT DOCUMENTS

| JP | 2001-150729 | 6/2001 |
| JP | 2002-218159 | 8/2002 |
| JP | 2003-92661 | 3/2003 |

* cited by examiner

*Primary Examiner*—Stephone B. Allen (74) *Attorney, Agent, or Firm*—Oblon, Spivak, McClelland, Maier & Neustadt, P.C.

(57) ABSTRACT

An image sensor is provided with a light source for illuminating an original document with light, a plurality of rod lens arrays arranged continuously and connected to each other in such a manner that end rod lenses located at the ends of the rod lens arrays are in contact with each other among rod lenses for forming images of light reflected from the original document, a sealing agent that fills in each of gaps between the end rod lenses, light-receiving elements for receiving image-forming light produced by the rod lenses over a prescribed reading width, and a frame to which the rod lens arrays are fixed via buffers over the prescribed reading width. A long image sensor can be realized at a low cost by using short, general-purpose rod lens arrays.

7 Claims, 5 Drawing Sheets

IMAGE SENSOR

BACKGROUND OF THE INVENTION

1. Field of the Invention

The present invention relates to an image sensor and an LED print head that are used in image input devices, image writing devices, etc. In particular, the invention relates to a long contact image sensor incorporating a rod lens array.

2. Description of the Related Art

An image sensor incorporating a rod lens array that is interposed between first and second frames is disclosed in FIG. 1 of JP-A-2002-218159 as a device incorporating a rod lens array.

Further, a writing device in which three rod lenses are packaged integrally by a package case and a device body is disclosed in FIG. 1 of JP-A-2001-150729.

In FIG. 1 of JP-A-2002-218159, reference numeral 1 denotes an image sensor; 2, a glass plate; 3; a frame, 6; light sources; 8, a rod lens array consisting of a plurality of rod lenses arranged in one direction; 9, light-receiving elements; 10, a sensor substrate; and 18, an original document. The rod lens array 8 has only a single rod lens array extending in the one direction.

In FIG. 1 of JP-A-2001-150729, reference numeral 1 denotes a light-emitting element array substrate; 2, a light-emitting element array; 3A–3C, rod lens arrays; 4, a package case; 5, a device body; and 8, connecting members. Although the three rod lens arrays 3A–3C extend in one direction, they have overlap regions that overlap with each other perpendicularly to the array extending direction and hence do not form a single straight line (i.e., one-dimensional arrangement).

In the above-configured conventional image sensor, the rod lens array of the image sensor is a single rod lens array whose length corresponds to a reading width. Therefore, in designing a long image sensor, it is necessary to use a dedicated rod lens array whose length suits an intended reading width. A problem arises that such a rod lens array should necessarily be expensive.

Although the conventional long writing device employs the plurality of rod lens array, writing lines do not have a one-dimensional arrangement. Rod lenses close to each other of adjoining rod lens arrays produces different image forming positions, electrical corrections for positional deviations between the image writing lines are needed in writing.

SUMMARY OF THE INVENTION

In the above-configured conventional image sensor, the rod lens array of the image sensor is a single rod lens array whose length corresponds to a reading width. Therefore, in designing a long image sensor, it is necessary to use a dedicated rod lens array whose length suits an intended reading width. A problem arises that such a rod lens array should necessarily be expensive.

Although the conventional long writing device employs the plurality of rod lens array, writing lines do not have a one-dimensional arrangement. Rod lenses close to each other of adjoining rod lens arrays produces different image forming positions, electrical corrections for positional deviations between the image writing lines are needed in writing.

The present invention has been made to solve the above problems, and an object of the invention is therefore to provide an image sensor incorporating an inexpensive rod lens array that is long but has a one-dimensional arrangement.

An image sensor according to one aspect of the invention comprises a light source for illuminating an object with light; a plurality of rod lens arrays arranged adjacent to each other and continuously in such a manner that rod lenses for focusing light reflected from the object are separated from each other and form a linear arrangement and that end rod lenses located at the ends of the rod lens arrays are in contact with each other; light-receiving elements for receiving image-forming light produced by the rod lenses over a prescribed reading width; and a frame to which the plurality of rod lens arrays arranged continuously are fixed over the prescribed reading width.

This configuration makes it possible use short, general-purpose rod lens arrays by connecting (joining) those to each other, and hence provides an advantage that a long but inexpensive image sensor can be realized.

An image sensor according to another aspect of the invention comprises a light source for illuminating an object with light; a plurality of rod lens arrays arranged adjacent to each other and continuously in such a manner that rod lenses for focusing light reflected from the object are separated from each other and form a linear arrangement and that end rod lenses located at the ends of the rod lens arrays are in contact with each other; light-receiving elements for receiving image-forming light produced by the rod lenses over a prescribed reading width; a frame to which the plurality of rod lens arrays arranged continuously are fixed via buffer members over the prescribed reading width, the frame being formed with a plurality of through-holes each having an opening that faces one of the buffer members; and screws inserted in the respective through-holes.

With this configuration, the inclination of each rod lens array can be corrected so that its optical axis coincides with a prescribed optical axis by pushing the rod lens array with a screw from outside the frame. Therefore, the image forming position of each rod lens array can be adjusted with respect to an original document and the light-receiving elements, and high-quality image reading that is free of image blurring can be attained over a wide reading width.

The foregoing and other objects, features, aspects, and advantages of the present invention will become more apparent from the following detailed description of the present invention when taken in conjunction with the accompanying drawings.

DETAILED DESCRIPTION OF THE INVENTION

Embodiment 1

A first embodiment of the present invention will be hereinafter described.

Figure 1:
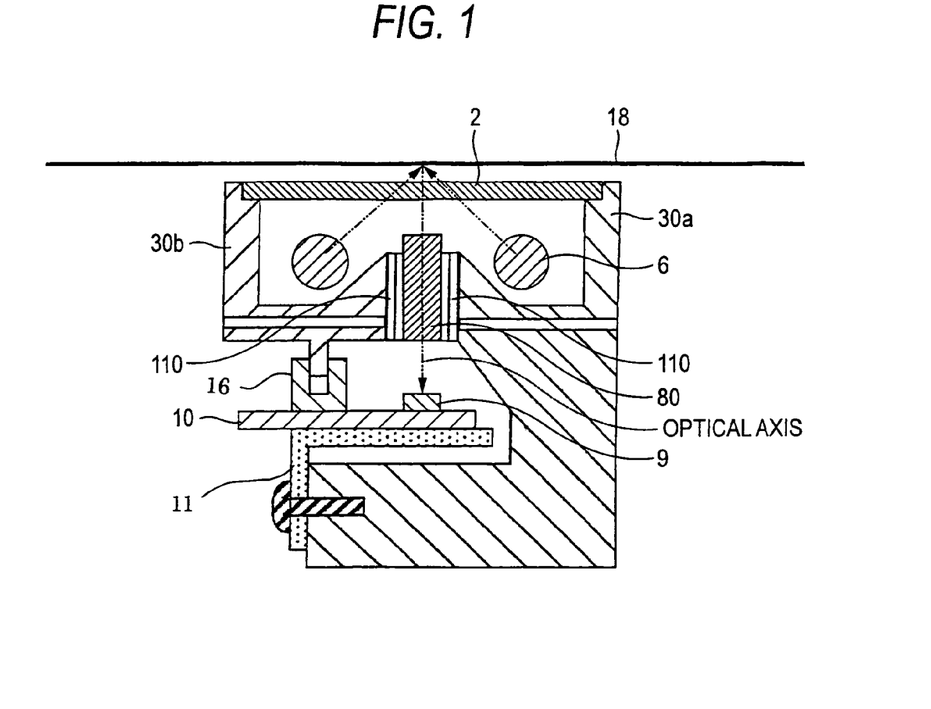
FIG. 1 is a sectional view of an image sensor according to a first embodiment of the invention.

FIG. 1 is a sectional view showing the configuration of an image sensor according to the first embodiment of the invention. Reference numeral 2 denotes a glass plate having an object (e.g., an original document or a bill) running surface; 6, linear light sources for illuminating an object; 9, light-receiving elements (sensor ICs) for receiving light that is reflected from the object; 10, a sensor substrate on which the light-receiving elements 9 are provided; 11, an L-shaped plate that supports the sensor substrate 10; 16, a shield member for shielding from external light; and 18, the object that is located above the image sensor and runs on the top surface of the glass plate 2 relatively to the image sensor.

Reference numeral 30 denotes a frame that houses the glass plate 2, the light sources 6, the sensor substrate 10, etc. The frame 30 is composed of a first frame 30a and a second frame 30b. The reference numeral 80 denotes rod lens arrays that are interposed between the first frame 30a and the second frame 30b, and numeral 110 denotes buffer members (double-sided adhesive tapes) that bond and fix the rod lens arrays 80 to the frame 30.

Figure 2:
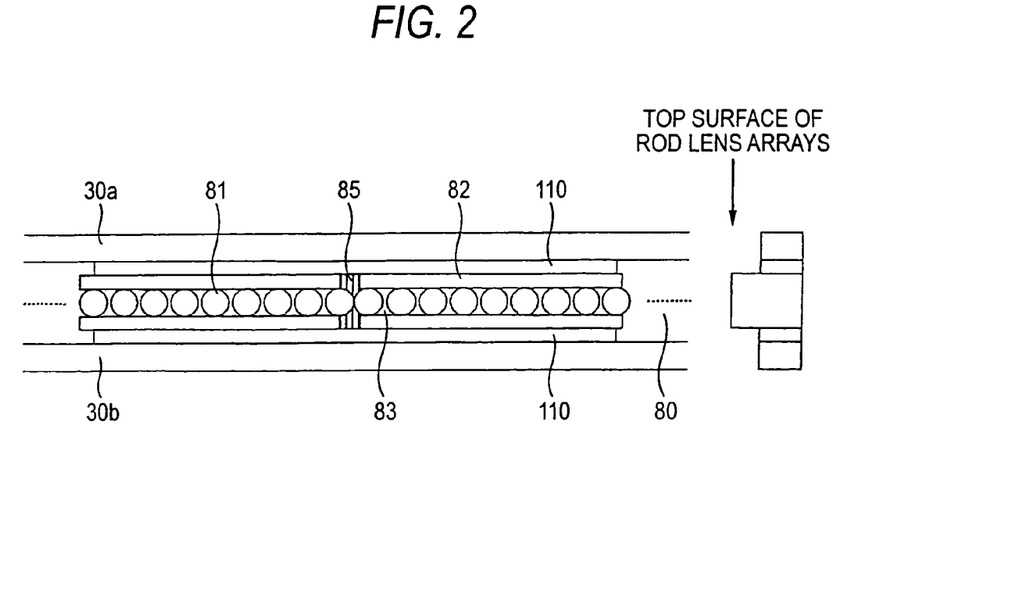
FIG. 2 illustrates rod lens arrays incorporated in the image sensor according to the first embodiment of the invention and members around the rod lens arrays.

FIG. 2 illustrates the rod lens arrays 80 incorporated in the image sensor and members around the rod lens arrays 80. In FIG. 2, reference numeral 81 denotes rod lenses; 82, side plates; 83, a (pseudo) adhesive that fixes the rod lenses 81 to the side plates 82 in a simulatory manner; and 85, a light shield sealing agent that fills in the spaces between the adjoining rod lens arrays 80.

Next, the operation will be described.

Figure 3A:
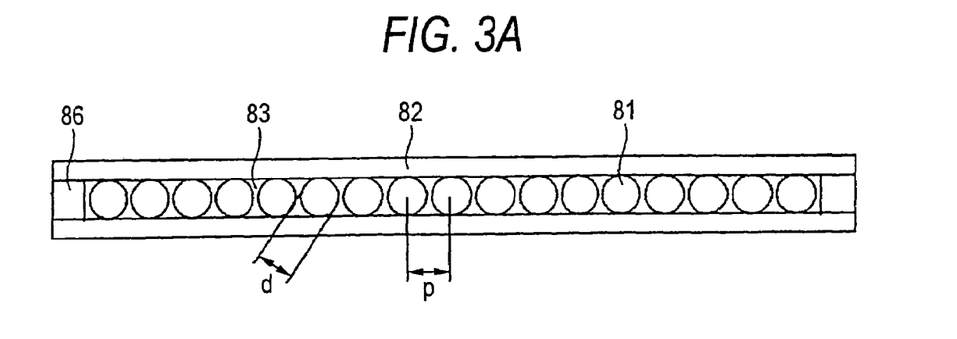
FIGS. 3A and 3B are plan views showing the shapes of rod lens arrays on the market.
Figure 3B:
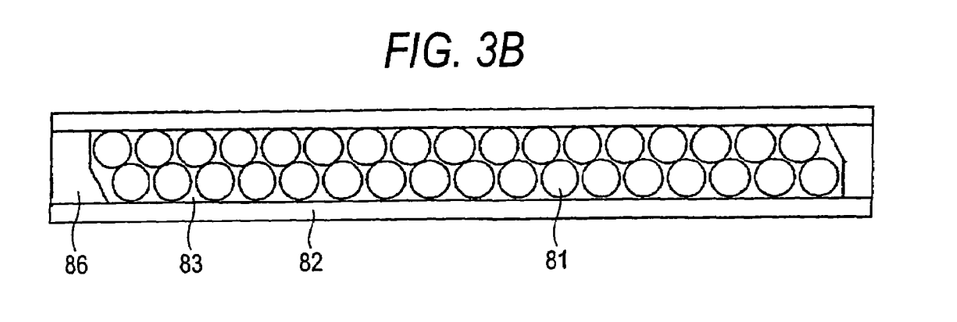

FIGS. 3A and 3B are plan views showing the shapes of general-purpose rod lens arrays (i.e., rod lens arrays on the market). Usually, an end plate 86 is provided at both ends of the rod lens array. The rod lens arrays of FIGS. 3A and 3B are called "single-line arrangement lens array" and "double-line arrangement lens array," respectively. The rod lenses 81 of the double-line arrangement lens array are arranged in a staggered manner.

Since the invention is intended to provide an image sensor having a long reading area whose effective reading width exceeds 900 mm, rod lens arrays on the market as shown in FIG. 3A or 3B are connected (joined) to each other. For example, three rod lens arrays of 280 mm in length and one shorter rod lens array are used.

Figure 4A:
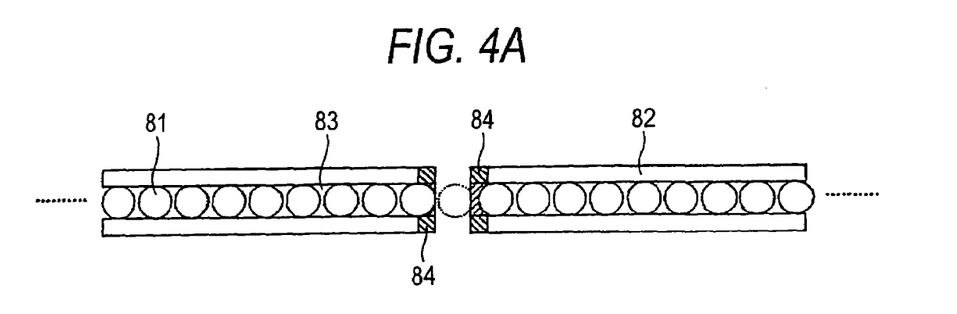
FIGS. 4A and 4B illustrate a rod lens array working method according to the first embodiment of the invention.
Figure 4B:
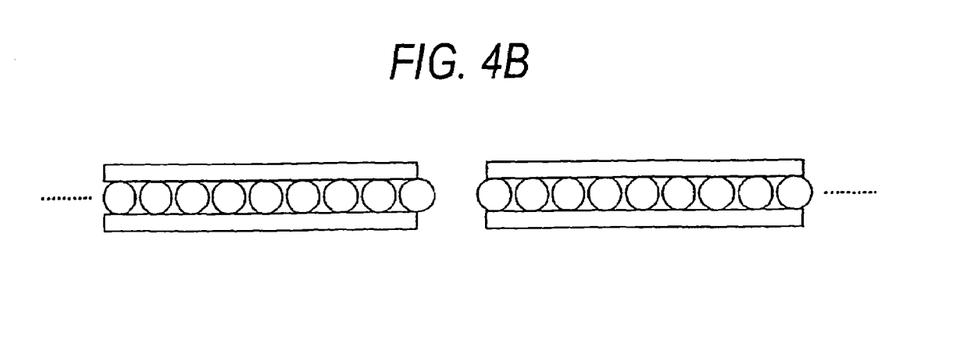

FIGS. 4A and 4B illustrate a working method for removing unnecessary portions of rod lens arrays on the market.

In the rod lens arrays 80 according to this embodiment using single-line arrangement lens arrays as shown in FIG. 3A, the pitch p of the rod lenses 81 is 0.7 mm and the diameter d of the rod lenses 81 is 0.6 mm. Therefore, the interval between the rod lenses 81 is as short as 0.1 mm.

Therefore, one rod lens 81 is removed in the case where mechanical working (milling) is performed.

First, as shown in FIG. 4A, a prescribed rod lens 81 is removed by removing four portions of the side plates 82 around the prescribed rod lens 81 by milling.

Then, portions of the side plates 82 that are close to outside portions of the rod lenses 81 that were adjacent to the removed rod lens 81 are subjected to milling. That is, hatched portions 84 of the side plates 82 are removed by grinding the side plates 82 from outside their side surfaces until reaching the outside portions of the rod lenses 81. In this case, it is appropriate to grind away portions of the side plates 82 that are within the rod lens 81 radius or less of the positions corresponding to the outermost lines of the removed rod lens 81.

FIG. 4B shows a state that the above-mentioned portions of the side plates 82 have been removed by grinding the side plates 82 from outside their side surfaces until reaching the outside portions of the rod lenses 81.

If portions of the side plates 82 whose length is greater than the radius of the rod lenses 81 were ground away, the rod lenses adjacent to the removed rod lens 81 might fall off. Conversely, if portions of the side plates 82 whose length is less than 0.1 mm were ground away, the optical axes of the individual rod lens arrays 80 might incline in a later assembling process (bonding process) in which the rod lens arrays 80 will be bonded to each other because of burrs of the ends of the side plates 82 of the adjoining rod lens arrays 80 or variations in the grinding accuracy in the optical axis direction.

Having very small grain diameters, unnecessary parts, around the outermost lines of the rod lenses 81 that were adjacent to the removed rod lens 81, of the adhesive 83 which fixes the rod lenses 81 to the side plates 82 can be removed by simple brushing.

In the case of using double-line arrangement lens arrays as shown in FIG. 3B, two adjoining rod lenses 81 belonging to the different lines of arrangement are removed and then the lens array is worked on in the same manner as portions of the side plates 82 of a single-line arrangement lens array are removed as described above.

A working method that is employed in the case where the end plates 86 are provided at the ends of each rod lens array will be described below with reference to FIGS. 5A–5C.

Figure 5A:
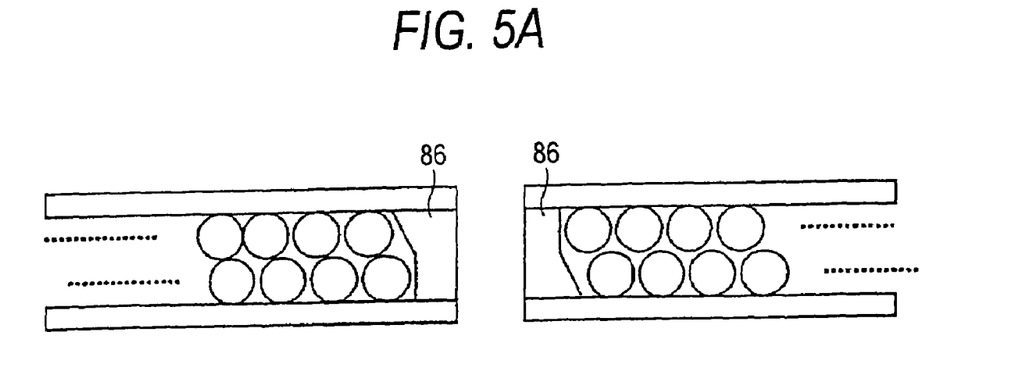
FIGS. 5A–5C illustrate another rod lens array working method according to the first embodiment of the invention.

FIG. 5A shows end portions of two-line arrangement lens arrays on the market. FIG. 5B shows a state that the end plates 86 are removed. Portions to be removed of the side plates 82 are indicated as black portions 84.

Milling on the end portions of the rod lens arrays does not include an operation of removing rod lenses 81. Therefore, in this embodiment, for the purpose of removing portions of the side plates 82, grinding for removing the end plates 86 is performed first.

Then, in this embodiment, grinding (cutting) by milling is performed to remove portions of the side plates 82 so that it is applicable no matter which of glass and plastics the rod lenses 81 are made of. Where the rod lenses 81 are made of glass, laser working may be employed.

Figure 5B:
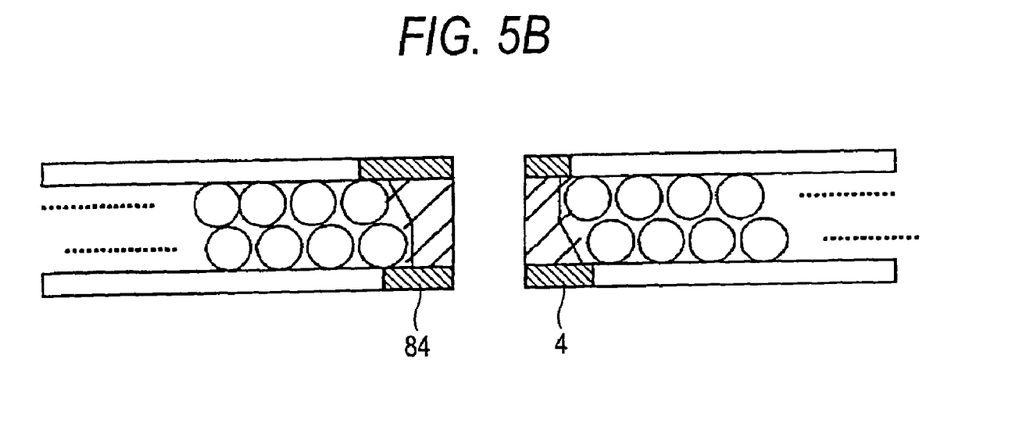
Figure 5C:
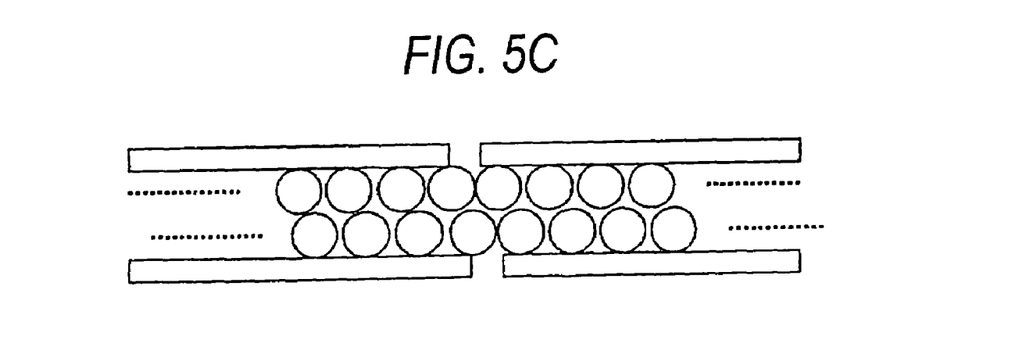

FIG. 5C schematically shows how two double-line arrangement lens arrays obtained by the above working are connected to each other. In the case of the double-line arrangement lens arrays, the two end rod lenses 81 of one lens array are joined to the two respective rod lenses 81 of the other lens array simultaneously.

Although in the example of FIGS. 5A and 5B the four portions of the side plates 82 of the two lens arrays are cut away, a modification is possible in which a portion of only one side plate 82 of each lens array is cut away and resulting lens arrays are joined to each other with the side plates 82 set so as to conform to each other.

Next, the order of assembling of the image sensor will be described.

Referring to FIG. 2, the double-sided adhesive tapes 110 are bonded to the frame 30 (i.e., the first frame 30a and the second frame 30*b*). Although in FIG. 2 each double-sided adhesive tape 110 is continuous, satisfactory results are obtained as long as each double-sided adhesive tape 110 is substantially continuous, that is, each double-sided adhesive tape 110 may be omitted partially.

The reason why the rod lens arrays 80 are fixed to the frame 30 continuously is as follows. When the temperature of the image sensor has varied, a dimensional difference occurs in the reading width direction (i.e., longitudinal direction) because of a difference between the thermal expansion coefficients of the frame 30 and the rod lens arrays 80, whereby the rod lens arrays 80 receive stress. The stress can be absorbed by the double-sided adhesive tapes 110 because the rod lens arrays 80 are fixed to the frame 30 (i.e., the first frame 30*a* and the second frame 30*b*) by the double-sided adhesive tapes 110 that are continuous over the approximately entire longitudinal length.

Conversely, in the case of partial fixing, stress is concentrated on unfixed portions though no stress occurs in fixed portions. If the joining portions of the rod lens arrays 80 are not bonded to each other, much stress occurs in the joining portions of the rod lens arrays 80.

Then, the rod lens arrays 80 are positioned with respect to the double-sided adhesive tape 110 that has been bonded to the frame 30*a* so that the rod lenses 81 that were adjacent to the removed end portions of the rod lens arrays 80 are brought into contact with each other and that the top surfaces of the rod lens arrays 80 become flush with each other, and the rod lens arrays 80 are bonded to the frame 30*a* mechanically (i.e., by using a jig).

At this time, a sealing agent 85 is applied to the rod lens arrays 80 so as to fill in the gaps between the end portions of the rod lens arrays 80. The application of the sealing agent 85 enhances the light shield effect in the portions where the end rod lenses 81 are exposed.

The portions where the end rod lenses 81 are exposed measure 1.2 mm at the maximum and 0.2 mm at the minimum. The sealing agent 85 is applied so as to cover such a length. It is preferable that the sealing agent 85 be applied so as to cover the entire length in the height direction (i.e., the optical axis direction) of the end rod lenses 81. However, sufficient image reading performance can be secured even if the sealing agent 85 covers only about a half of the length in the height direction of the end rod lenses 81.

In this embodiment, to attain a soft bonding effect, the sealing agent is a silicone resin adhesive. Further, the sealing agent 85 has a black color to prevent leakage of light from the end rod lenses 81 and entrance of external light. However, as for the light shield effect, sufficient shield performance can be secured if the sealing agent 85 is not transparent and has a semi-muddy color.

As for the light shield effect of the sealing agent 85, in this embodiment the sealing agent 85 may be required to cover a maximum length of 1.2 mm. To assure its light shield effect, the sealing agent 85 is applied so as to cover a length of 1.2 mm at the maximum. However, where the sealing agent 85 is to be applied so as to cover a length of about 0.2 to 0.5 mm, it need not necessarily be applied because the buffer members 110 located on both sides are also expected to exhibit a light shield effect.

In this embodiment, the rod lens arrays 80 are bonded to the frame 30*a* first via the double-sided adhesive tape 110. Conversely, the rod lens arrays 80 may be bonded to the frame 30*b* first.

FIG. 2 shows only the two adjoining rod lens arrays 80 that are connected to each other. However, the invention is intended to provide a long image sensor and hence both ends of each rod lens array 80 are connected to the adjacent rod lens arrays 80; that is, three or more rod lens arrays 80 may be connected to each other to form a linear arrangement.

In this embodiment, the double-sided adhesive tapes 110 are used as the buffer members in fixing the rod lens arrays 80 to the frame 30 (see FIG. 2). However, a soft adhesive such as a UV adhesive or a silicone adhesive can provide the same effect as the double-sided adhesive tapes 110 do. Where a UV adhesive or a silicone adhesive is used, an equivalent effect can also be attained by directly bonding the side surfaces of the rod lens arrays 80 to the top surfaces of the frame 30.

As described above, in the first embodiment, end portions of rod lens arrays having a size for general purposes are worked on and the resulting rod lens arrays are connected to each other in such a manner that the end rod lenses 81 are brought into contact with each other. The rod lens arrays 80 are fixed to the frame 30 almost over its entire length, and the sealing agent 85 fills in the gaps between the rod lens arrays 80 so that light does not pass through the rod lens arrays 80 through portions other than the rod lenses 81. Therefore, image portions corresponding to the connecting portions are not blurred. Further, a long image sensor capable of providing high image quality can be realized without the need for using a long rod lens array, that is, by using inexpensive rod lens arrays.

Embodiment 2

In the first embodiment, the rod lens arrays 80 are fixed to the frame 30 via the buffer members 110. A second embodiment is directed to a method for fixing the rod lens arrays 80 to the frame 30 more strongly by taking an additional measure.

The second embodiment of the invention will be described below with reference to FIG. 6. Members in FIG. 6 having the same or corresponding members in FIG. 2 are given the same reference symbols as the latter.

Figure 6:
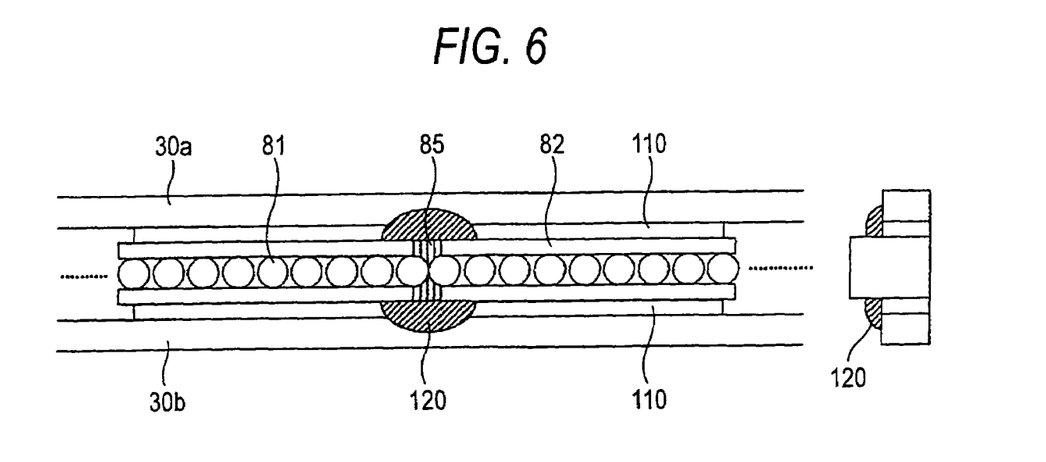
FIG. 6 illustrates rod lens arrays incorporated in an image sensor according to a second embodiment of the invention and members around the rod lens array.

In FIG. 6, reference numeral 120 denotes an adhesive that is applied, to reinforce the fixing of the rod lens arrays 80 to the frame 30, adjacent to the portions where the rod lens arrays 80 of the image sensor according to the first embodiment are connected to each other by using the sealing agent 85. As shown in FIG. 6, the adhesive 120 is applied to both frames 30*a* and 30*b*.

Although the rod lens arrays 80 are fixed to the frame 30 on both sides by using the continuous double-sided adhesive tapes 110, the double-sided adhesive tapes 110 tend to peel off partially because they are about 0.1 mm in thickness and employ a soft particulate adhesive. For example, if the double-sided adhesive tapes 110 that are fixed to the frame 30 almost over its entire length peel off partially because of a variation in temperature or humidity to cause a state that part of the rod lens arrays 80 are bonded to the frame 30 only in regions that are distant from their joining portion, the joining portion receives stress.

To prevent such an event, the adhesive 120 is applied to the joining portions of the rod lens arrays 80. As a result, the joining portions and their vicinities of the rod lens arrays 80 are necessarily fixed to the frame 30 irrespective of peeing positions of the double-sided adhesive tapes. Even if stress is concentrated on the joining portions of the rod lens arrays 80, the fixing by bonding of the rod lens arrays 80 to the frame 30 can be kept stable.

If a gap were formed between the end rod lenses 81 of adjoining rod lens arrays 80, the rod lens arrays 80 would be twisted or curved. This means deviations between the prescribed reading optical axis position of the original document 18 (see FIG. 1) and the individual rod lenses 81 and would result in a blurred image.

This embodiment can prevent the above phenomenon. Further, there does not occur a phenomenon that adjoining rod lenses 81 are pressed against each other and resulting compressive stress break rod lenses 81.

The sealing agent 85 is applied so as to have a width of 0.2 to 1.2 mm. The rod lenses 80 are bonded to the frame 30 (i.e., first frame 30a and second frame 30b) by applying the adhesive 120 as appropriate so as to cover the regions where the sealing agent 85 is applied.

The adhesive 120 is applied in such a manner as not to contact the rod lenses 81 directly, that is, without intervention of the sealing agent 85. Further, the adhesive 120 is applied so as not to project above the top surface of the rod lens arrays 80.

Although in this embodiment the joining portions of the rod lens arrays 80 are bonded to the frame 30 on both sides with a silicone adhesive, the same effect can also be attained with a urethane adhesive.

To increase the strength of the fixing, an epoxy adhesive may be used. In this case, point bonding is preferable in which the widths of the application regions of the epoxy resin that are adjacent to the joining portions of the rod lens arrays 80 do not much exceed the maximum application width 1.2 mm of the sealing agent 85. The point bonding makes it possible to reduce the degree of a bend from the linear arrangement line of the continuous rod lens arrays 80 due to a bimetal effect at the time of thermal expansion.

The reinforcement of the fixing of the rod lens arrays 80 to the frame 30 can be attained even by applying the adhesive 120 to only one of the frames 30a and 30b.

As described above, in the second embodiment, the rod lens arrays 80 are fixed to the frame 30 (i.e., first frame 30a and second frame 30b) by applying the adhesive 120 to the joining portions of the rod lens arrays 80. Therefore, the second embodiment provides the following advantages in addition to the advantages of the first embodiment. Even if the double-sided adhesive tapes 110 that are fixed to the frame 30 almost over its entire length peel off partially due to a variation in temperature or humidity, the adhesive 120 that is applied to the joining portions prevents bending of the rod lens arrays 80 and destruction of the rod lenses 81. That is, the rod lens arrays 80 can be fixed to the frame 30 in a stable manner.

Embodiment 3

Whereas in the second embodiment the adhesive 120 is applied to the joining portions and their vicinities of the adjoining rod lens arrays 80, a third embodiment is directed to a method of applying an adhesive to portions of the rod lens arrays 80 other than the joining portions and their vicinities.

The third embodiment of the invention will be described below with reference to FIG. 7.

Figure 7:
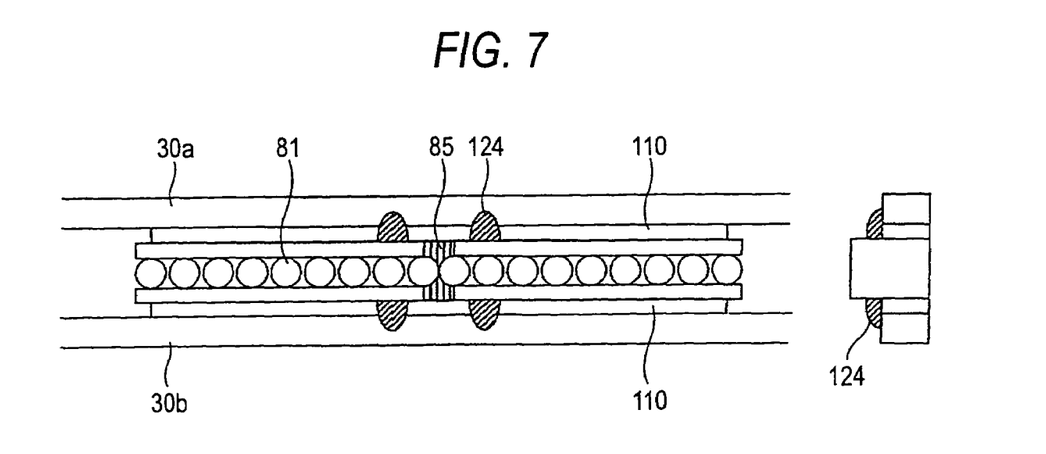
FIG. 7 illustrates rod lens arrays incorporated in an image sensor according to a third embodiment of the invention and members around the rod lens array.

In FIG. 7, reference numeral 124 denotes an adhesive that is applied to portions of the rod lens arrays 80 other than the joining portions and their vicinities. The adhesive 124 is applied to both frames 30a and 30b. Although the adhesive 124 is applied to portions of the rod lens arrays 80 near the joining portions, it is not applied to the exposed circumferential surfaces of the end rod lenses 81.

The sealing agent 85 is mainly intended to provide the light shield effect rather than serves as the bonding means. That is, the sealing agent 85 provides the effect of bonding the adjoining end rod lenses 81 to each other and the light shield effect for the end rod lenses 81 but does not contribute to the fixing of the rod lens arrays 80 to the frame 30.

On the other hand, the adhesive 124 is intended to fix the rod lens arrays 80 to the frame 30 (i.e., first frame 30a and second frame 30b). Therefore, the adhesive 124 becomes hard when it is set. In particular, this may cause a problem in the case where the rod lenses 81 are made of glass and hence are fragile. If the adhesive 124 were applied to the exposed circumferential surfaces of the end rod lenses 81, the adhesive 124 might peel off a circumferential surface layer of a glass end rod lens 81 due to a difference between the thermal expansion coefficients of the rod lens 81 and the adhesive 124 and thereby deteriorate the optical image forming function of the rod lens 81.

In this embodiment, the adhesive 124 is surely prevented from contacting the exposed circumferential surfaces of the end rod lenses 81 and their vicinities.

In the second embodiment, the sealing agent 85 intervenes between the end rod lenses 81 and the adhesive 120 to prevent their contact. In contrast, in this embodiment, the adhesive 124 is separated from the application regions of the sealing agent 85 and is applied in a point like manner at positions near and on both sides of each of the joining portions of the adjoining rod lens arrays 80.

The above structure prevents a problem that would otherwise be caused by the adhesive 124's penetrating to reach end rod lenses 81.

The reinforcement of the fixing of the rod lens arrays 80 to the frame 30 can be attained even by applying the adhesive 124 to only one of the frames 30a and 30b.

As described above, in the third embodiment, the adhesive 124 is applied in a distributed manner at positions that are near but are separated from the application regions (i.e., the connecting portions of the rod lens arrays 80) of the sealing agent 85 so as to be surely prevented from contacting the exposed circumferential surfaces of the end rod lenses 81 and their vicinities. Therefore, the adhesive 124 does not penetrate through the sealing agent 85 to reach the end rod lenses 81 of the adjoining rod lens arrays 80 and hence the optical performance of the end rod lenses 81 is prevented from being deteriorated. This provides an advantage that the reading quality of the image sensor is kept stable.

Embodiment 4

Whereas the first to third embodiments are directed to the methods for connecting and fixing the rod lens arrays 80, a fourth embodiment is directed to an optical axis adjustment that is performed after the rod lens arrays 80 have been incorporated in the image sensor.

Figure 8:
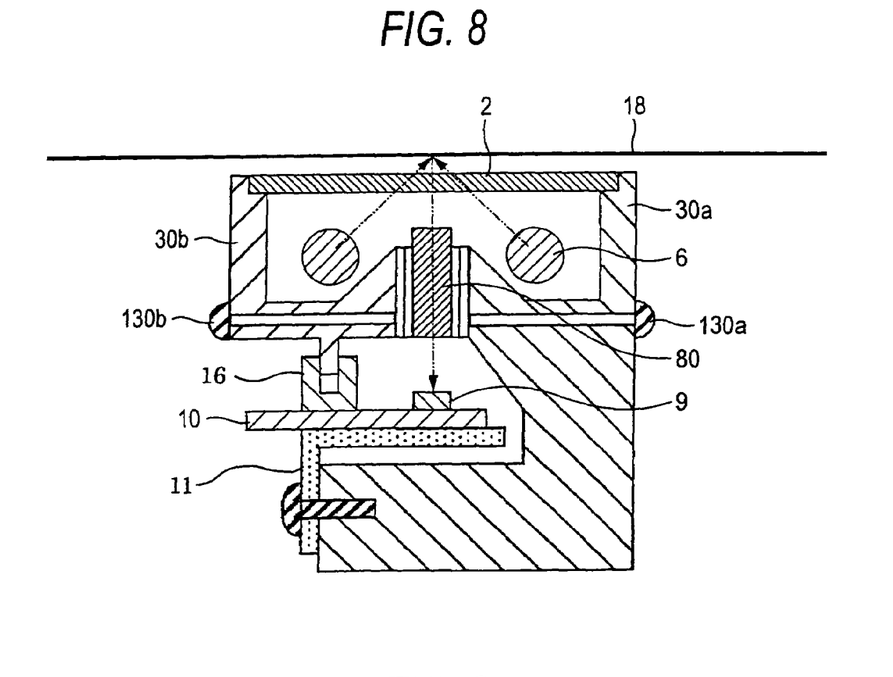
FIG. 8 is a sectional view showing the configuration of an image sensor according to the fourth embodiment of the invention.

FIG. 8 is a sectional view showing the configuration of an image sensor according to the fourth embodiment. Members in FIG. 8 having the same or corresponding members in FIG. 1 are given the same reference symbols as the latter.

In FIG. 8, reference numeral 130 denotes adjustment screws; that is, reference numerals 130a and 130b denote adjustment screws provided on the frame 30a side and on the frame 30b side, respectively.

Figure 9:
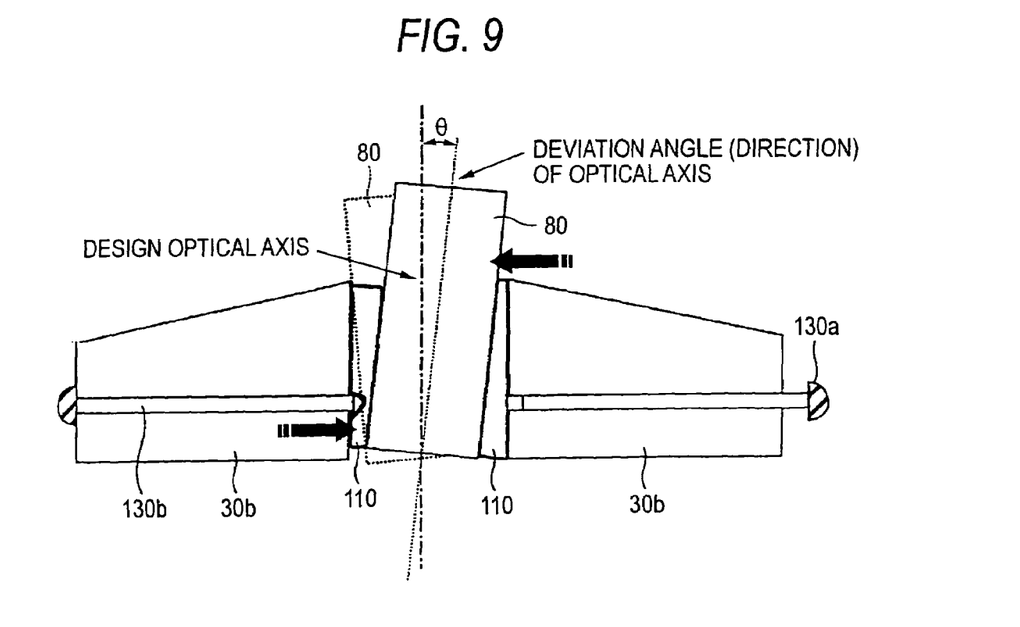
FIG. 9 shows how an inclination adjustment is performed on rod lens arrays of the image sensor according to the fourth embodiment of the invention.

Next, the operation will be described. FIG. 9 is a schematic diagram illustrating a state of fixing of the rod lens arrays 80 to the frame 30.

It is apparent from FIG. 9 that if an original document is read in a state that a certain angle θ is formed by the optical axis of the rod lens array 80 and the intrinsic, design optical axis of the image sensor, a deviation occurs from an image position that should be subjected to reading. Since a plurality of rod lens arrays 80 are incorporated in the image sensor, it is necessary to make adjustments so that each of the optical axes of the respective rod lens arrays 80 coincides with the intrinsic, design optical axis.

Usually, even if two rod lens arrays 80 are connected to each other to form a linear arrangement, the positions and the directions of the optical axes of the two rod lens arrays 80 become different from each other because of shape differences between the rod lens arrays 80 due to external form allowances, a shape variation of the frame 30 that occurs in its manufacture, a thickness variation of the double-sided adhesive tapes 110, and other factors.

In particular, because of a long image formation distance, a difference in the optical axis direction results in a large variation in the image forming position. Even if the angular deviation θ from the design optical axis of the rod lens array 80 is within 1°, a reading position deviation of about one pixel may occur in the case where the image sensor has a pixel density of 600 dpi. That is, where two rod lens arrays 80 are connected to each other, linear images having a step of one pixel at a position corresponding to the connecting position of the two rod lenses 80 are obtained though an image portion being subjected to reading is a single line. A correct image cannot be reproduced on the output side such as a writing device.

Referring to FIG. 9, an adjustment is performed so that the optical axis of each inclined rod lens array 80 coincides with the intrinsic optical axis by using the adjustment screws 130 (130a and 130b) inserted in the frame 30. The adjustment is performed by using a projector so that each rod lens array 80 is erected vertically.

In this embodiment, a threaded hole (M2.5) is formed in advance for each rod lens array 80 so as to penetrate through each of the frames 30a and 30b and have openings in the outside surface and the surface opposed to the rod lens array 80.

For example, since the rod lens array 80 that is located on the view's side in FIG. 9 is inclined rightward, its optical axis is adjusted so as to coincide with the intrinsic, design optical axis by using the adjustment screw 130b. Since the rod lens array 80 that is located on the deep side in FIG. 9 (indicated by a broken line) is inclined leftward, its optical axis is adjusted so as to coincide with the intrinsic, design optical axis by using the adjustment screw 130a. Alternatively, only one of the two rod lens arrays 80 is adjusted so that they are not inclined relatively to each other.

The adjustment of the inclination of each rod lens array 80 causes the rod lens array 80 to move such a short length as tens of micrometers. Therefore, through contraction of expansion the 100-μm-thick double-sided adhesive tapes 110 as the buffer members can absorb distortion that is caused by the movement of each rod lens array 80. Therefore, there does not occur reduction in the strength of bonding of the rod lens arrays 80 to the frame 30. Further, since the sealing agent 85 is a soft adhesive, no problem is caused by the end rod lenses 81's peeling off each other.

It is preferable that two or more adjustment screws 130 be provided on each side for each rod lens array 80.

As described above, in this embodiments the adjustment screws 130 are provided to make it possible to adjust, to a desired inclination, the inclination of each of the continuous rod lens arrays 80 that are fixed to the frame 30. This enables correct reading of an actual image.

In this embodiment, the adjustment screws 130 are used for adjusting the inclinations of the rod lens arrays 80 and hence adjustments can be made from outside the image sensor. Alternatively, tapping screws, rivets, or the like may be used instead of the adjustment screws 130. All or part of the tapping screws, the rivets, or the like may be removed after adjustments have completed and it has been confirmed that the rod lens arrays 80 are fixed to the frame 30 strongly.

An effect similar to the effect of projecting the adjustment screws 130 can be obtained by correcting the inclination of each rod lens array 80 by inserting, in advance, minute spacers having a thickness of about 0.03 mm or like members between the rod lens arrays 80 and the frame 30.

It goes without saying that the working and assembling methods for the rod lens arrays 80 of the image sensor that have been described in the first to fourth embodiments can be applied to rod lens arrays that are used in image writing devices and general copiers and should be relatively long.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An image sensor comprising:
   a light source for illuminating an object with light;
   a plurality of rod lens arrays arranged adjacent to each other and continuously in such a manner that rod lenses for focusing light reflected from the object are separated from each other and form a linear arrangement and that end rod lenses located at the ends of the rod lens arrays are in contact with each other;
   light-receiving elements for receiving image-forming light produced by the rod lenses over a prescribed reading width; and
   a frame to which the rod lens arrays are fixed over the prescribed reading width.

2. The image sensor according to claim 1, wherein each of gaps between the end rod lenses is filled with a sealing agent.

3. The image sensor according to claim 2, wherein the plurality of rod lens arrays arranged continuously are fixed to the frame by an adhesive that is applied so as to cover the sealing agent that fills in each of the gaps between the end rod lenses.

4. The image sensor according to claim 2, wherein the plurality of rod lens arrays arranged continuously are fixed to the frame by an adhesive that is applied near and on both sides of the sealing agent that fills in each of the gaps between the end rod lenses.

5. The image sensor according to claim 1, wherein the plurality of rod lens arrays arranged continuously are fixed to the frame via buffer members that extend over the prescribed reading width.

6. An image sensor comprising:
   a light source for illuminating an object with light;
   a plurality of rod lens arrays arranged adjacent to each other and continuously in such a manner that rod lenses for focusing light reflected from the object are separated from each other and form a linear arrangement and that end rod lenses located at the ends of the rod lens arrays are in contact with each other;
   light-receiving elements for receiving image-forming light produced by the rod lenses over a prescribed reading width;
   a frame to which the plurality of rod lens arrays arranged continuously are fixed via buffer members over the prescribed reading width, the frame being formed with a plurality of through-holes each having an opening that faces one of the buffer members; and screws inserted in the respective through-holes, for allowing adjustments of inclinations of the individual rod lens arrays.

7. An image sensor comprising:

a light source for illuminating an object with light;

a plurality of rod lens arrays arranged adjacent to each other and continuously in such a manner that rod lenses for focusing light reflected from the object are separated from each other and form a linear arrangement and that end rod lenses located at the ends of the rod lens arrays are in contact with each other;

light-receiving elements for receiving image-forming light produced by the rod lenses over a prescribed reading width;

a frame to which the plurality of rod lens arrays arranged continuously are fixed via buffer members over the prescribed reading width; and spacers inserted between the frame and the buffer members, plural ones of the spacers allowing an adjustment of an inclination of each of the rod lens arrays.

* * * * *